UNITED STATES PATENT OFFICE.

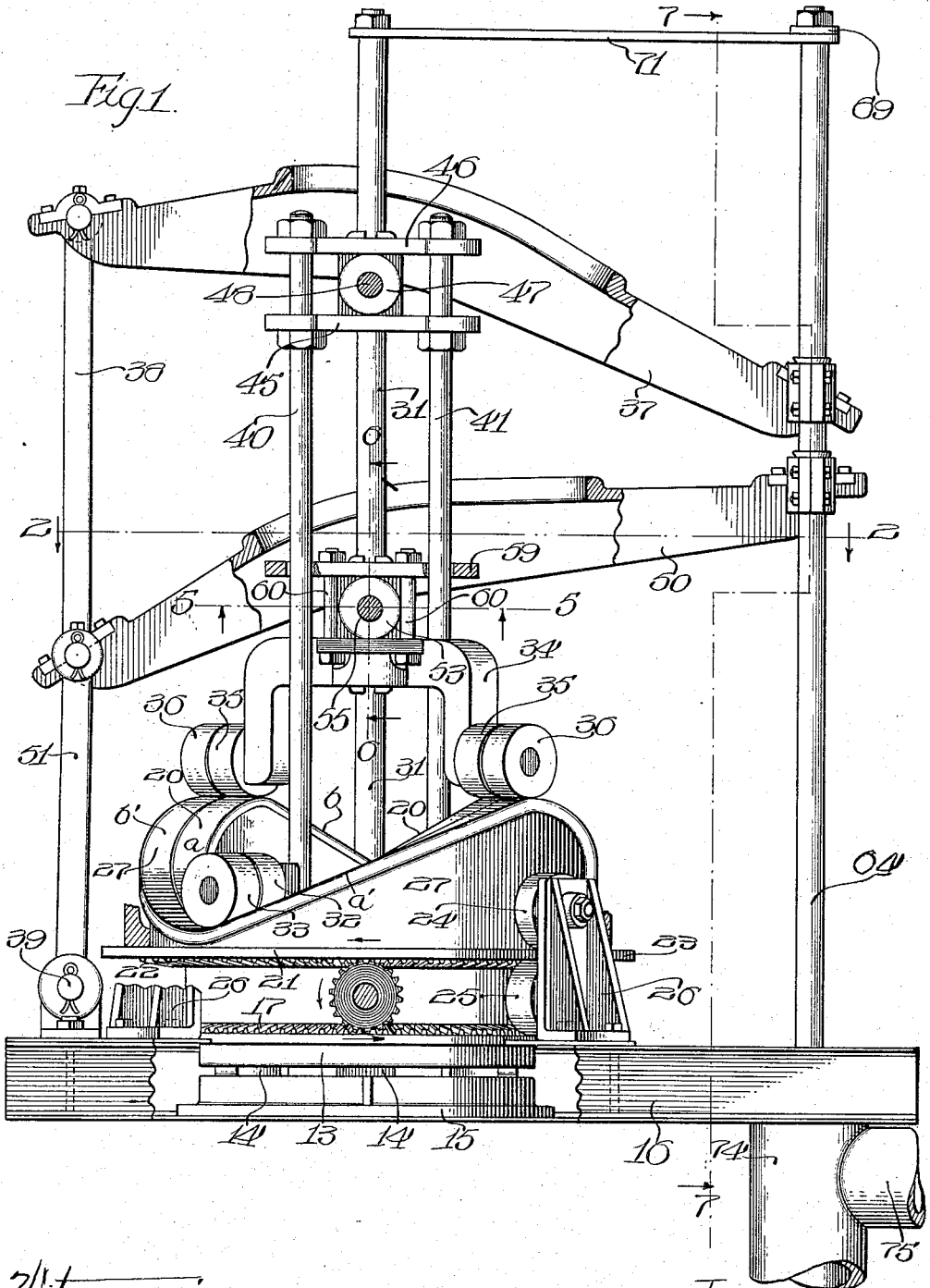

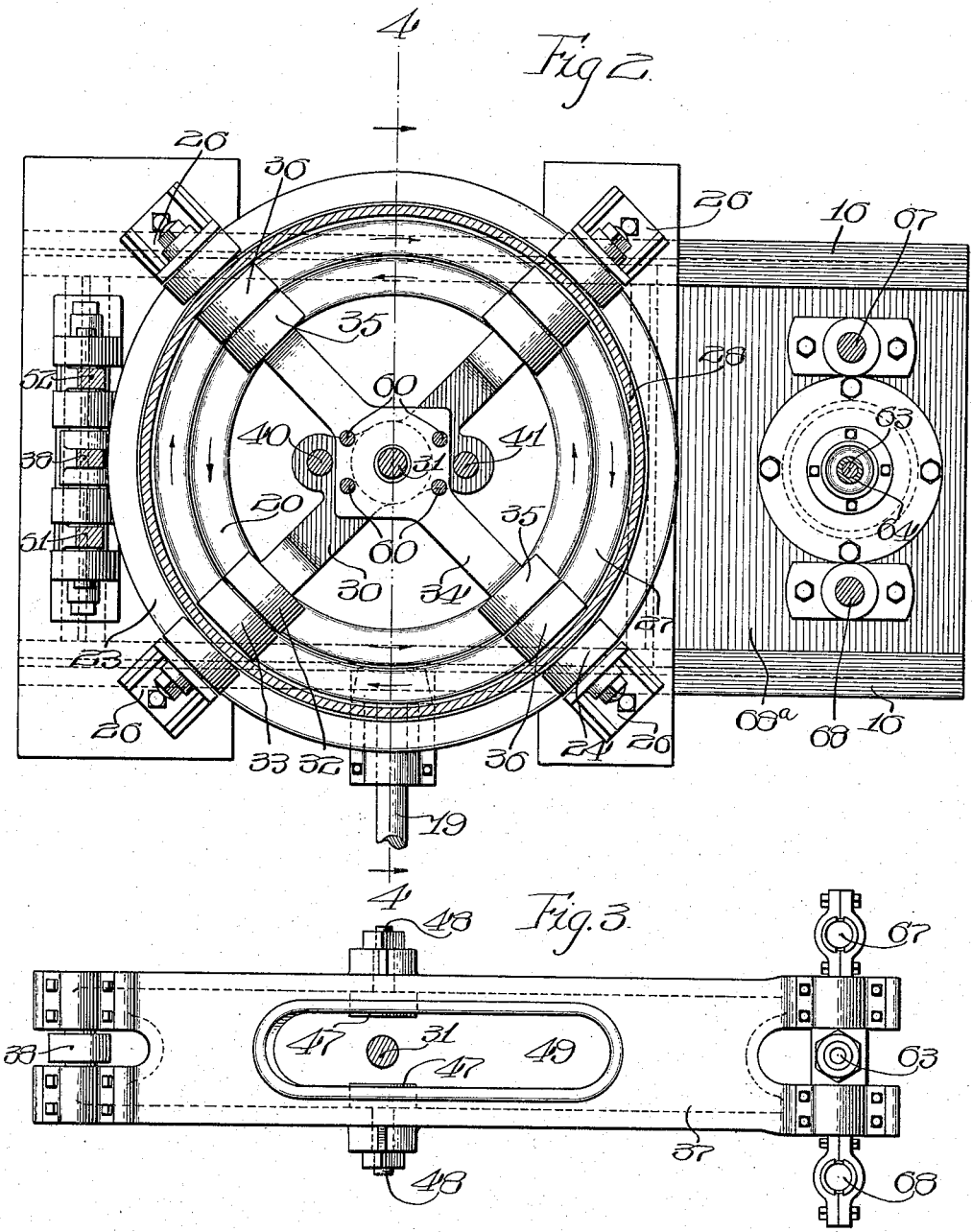

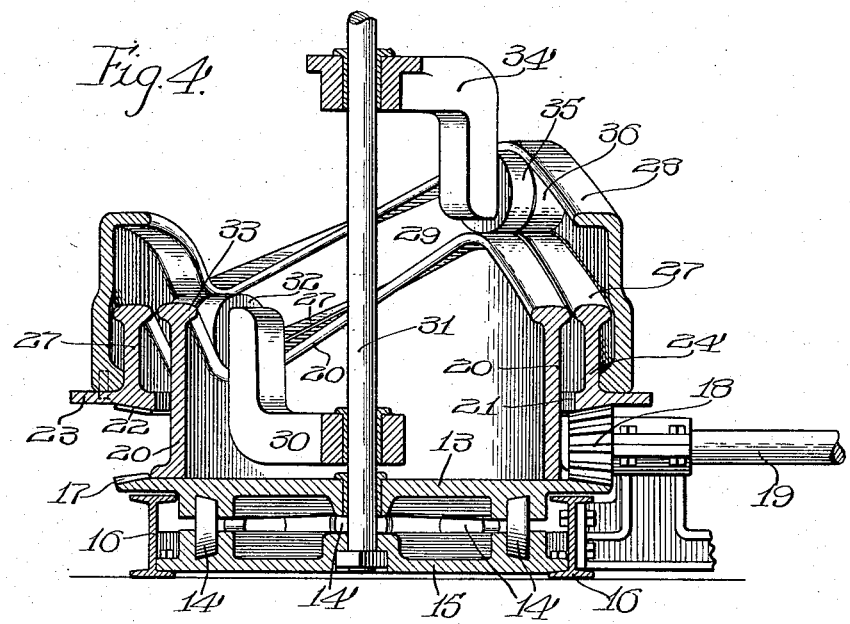
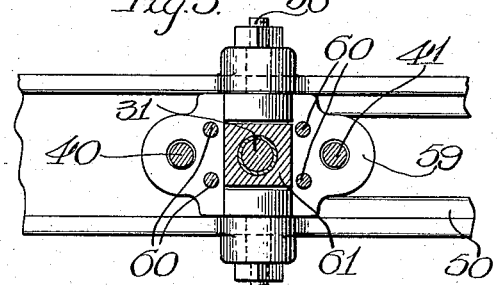
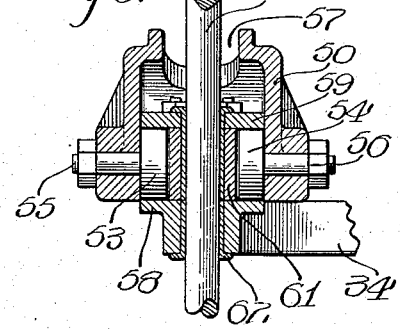

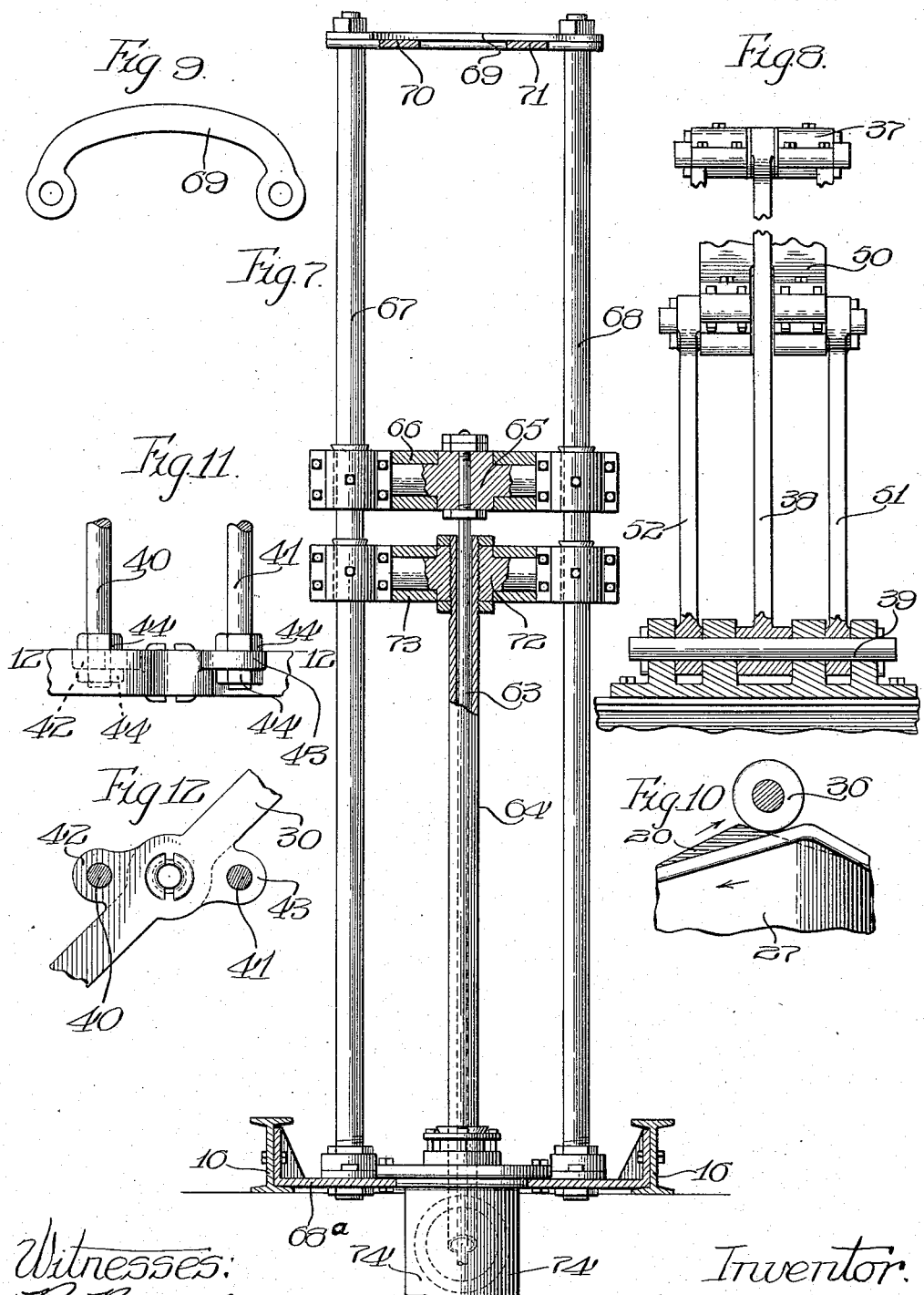

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

PUMPING MACHINERY.

1,174,122.  Specification of Letters Patent.  Patented Mar. 7, 1916.

Application filed November 22, 1912.  Serial No. 732,846.

*To all whom it may concern:*

Be it known that I, MATTHEW T. CHAPMAN, a citizen of the United States, residing at Aurora, in the county of Kane, State of Illinois, have invented certain new and useful Improvements in Pumping Machinery, of which the following is a specification, reference being had to the accompanying drawings.

My invention relates to pumping machinery, designed for use in pumping water from deep wells, and has for its object to provide new and improved mechanism for operating a single or double-acting reciprocating pump.

To this end, my invention, broadly considered, comprises improved rotary cam mechanism for reciprocating one or more plungers, and at the same time overcoming the tendency of the plunger or plungers to rotate; also the arrangement of such cam operating mechanism so that it operates in the case of a double-acting pump to secure a continuous or uninterrupted discharge of water; also the combination of such cam operating mechanism with lever mechanism interposed between the cam mechanism and the plunger rod or rods, for increasing the length of the stroke and the efficiency of the pump.

In the accompanying drawings in which I have illustrated my invention as embodied in a double-acting pump,—Figure 1 is a side elevation, certain parts being broken away; Fig. 2 is a horizontal section on line 2—2 of Fig. 1, the lower operating lever being removed; Fig. 3 is a plan view of the upper operating lever and some of the parts connected thereto; Fig. 4 is a vertical section on line 4—4 of Fig. 2; Fig. 5 is a horizontal section on line 5—5 of Fig. 1; Fig. 6 is a vertical section on line 6—6 of Fig. 1; Fig. 7 is a vertical section on line 7—7 of Fig. 1; Fig. 8 is an elevation showing the swinging supports, or fulcra, of the operating levers; Fig. 9 is a detail, being a plan view of the brace which connects the guides for some of the operating parts; Fig. 10 is a detail, being a partial side elevation of the cams, illustrating the position of one of the cross-heads near the upper end of its stroke; Fig. 11 is a detail, being a partial side view of the rods which connect the lower cross-head to the upper lever, showing the manner of securing said rods to the lower cross-head; and Fig. 12 is a horizontal section on line 12—12 of Fig. 11.

Referring to the drawings,—13 indicates a horizontal rotary member or support, which, as best shown in Fig. 4, is mounted on a series of anti-friction rollers 14, which travel in suitable ways provided in a base-plate 15, said base-plate being preferably mounted between the flanges of I-beams 16. The rotary member 13 is provided at its upper margin with an annular rack 17, which is engaged and driven by a beveled gear 18, mounted on a drive shaft 19, which may be driven in any suitable way. The rotary member 13 carries on its upper surface near its margin, an upwardly projecting cam 20, the shape of which is best shown in Figs. 1 and 4, in which it will be seen that said cam is provided with two diametrically-disposed ridges, or high points, and two diametrically-disposed troughs, or low points, all connected by inclined surfaces. The troughs, however, are not equally distant from the ridges, but considering the direction of rotation of the cam, lie somewhat farther from the approaching ridge than from the receding one, the purpose being to make the lifting incline somewhat longer than the lowering incline, in order to make the lifting strokes of the two plungers overlap slightly, as hereinafter described.

21 indicates a second rotary member or support which is annular in form and overlies the marginal portion of the lower member 13, as shown in Figs. 1 and 4. The member 21 is provided on its under side, near its margin, with an annular rack 22, which overlies the rack 17 and also engages the drive gear 18. Said member 21 is provided with a marginal flange 23, which runs between upper and lower rollers 24—25, carried by brackets 26 at convenient intervals around the periphery of said member 21, the purpose of said rollers being to support the upper member and keep it in place, as best shown in Fig. 1.

27 indicates a second cam, which is carried by the rotary member 21. The contour of the upper face of the cam 27 corresponds with that of the cam 20, except that as said cam 27 is intended to rotate in an opposite direction to the cam 20, the long and short inclines are correspondingly disposed. The two cams are so set that their ridges, or high portions, are adapted to be brought into register by the rotation of said cams in opposite directions, and in like manner the troughs, or low portions thereof, are also caused to register as said cams rotate.

28 indicates a guide, carried by the upper rotary member 21 and projecting over the cam 27 to form a channel 29, which serves to hold the upper cross-head in place, as illustrated in Fig. 4.

30 indicates a lower U-shaped cross-head, which is pivotally mounted centrally upon a vertically-disposed guide rod or shaft 31, secured at its lower end to the base-plate 15 axially of the rotary member 13. Said cross-head is provided with journals at its outer end, each of which carries inner and outer rollers 32—33, adapted to travel on the upper surfaces of the cams 20—27, as best shown in Figs. 1 and 4.

34 indicates an upper cross-head, which is also U-shaped and is inverted over the lower cross-head 30, and is arranged at right angles therewith. Said cross-head is also pivotally mounted on the shaft 31, and carries inner and outer rollers 35—36, respectively, which run on the upper surface of the cams 20—27, as shown in Figs. 1 and 4.

37 indicates an upper operating lever, which at one end is fulcrumed upon a swinging link or fulcrum 38, pivoted at its lower end upon a shaft 39, carried on the base of the machine, as shown in Figs. 1, 2 and 8. Said lever is connected intermediately of its ends with the lower cross-head 30, by means of connecting rods 40—41, which are secured to said cross-head by means of ears 42—43 and nuts 44, as shown in Figs. 11 and 12. Said connecting rods extend upward at opposite sides of the cross-head 34 and are connected to parallel bars 45—46, as shown in Fig. 1, said bars being spaced apart to receive rollers 47, mounted on pivots 48, carried by the upper lever 37, at opposite sides of an elongated opening or slot 49 in said lever, as shown in Figs. 1 and 3. The purpose of this arrangement is to permit the connection between the rods 40—41 and lever 37 to move transversely to a slight extent, as required in the operation of said levers.

50 indicates a lower operating lever, which is similar to the lever 37 below which it is arranged. The lever 50 is fulcrumed at one end on vertically-disposed swinging links or fulcra 51—52, as best shown in Figs. 1, 2 and 8, which links are also mounted on the shaft 39. The lever 50 is connected with the upper cross-head 34, as shown in Figs. 1, 5 and 6, by means of rollers 53—54, mounted on pivots 55—56, at opposite sides of a central slot 57 in said lever, said rollers resting upon a flange 58 on the upper side of the cross-head 34, and running under an overlying plate 59, which is secured to the cross-head 34 by bolts 60, as best shown in Fig. 1. 61 indicates a spacing block, mounted on the shaft 31, between the cross-head 34 and the plate 59 to properly space said parts and prevent binding of the rollers 53—54.

62 indicates a brass bearing around the shaft 31.

From the foregoing description it will be seen that the raising and lowering of the cross-heads 30—34 will act to swing the levers 37—50 up and down and at the same time will permit the connections between said levers and the cross-heads by which they are operated to move transversely to a limited extent.

As shown in Fig. 7, 63 indicates an inner plunger rod, which is connected with one of the plungers in the well, and 64 indicates a tubular plunger rod through which the plunger rod 63 extends, the tubular plunger rod 64 being connected with the other plunger in the well. The plunger rod 63 is connected by a swivel connection 65 with a cross-head 66, which slides vertically on guide rods 67—68, supported on a base-plate 68$^a$, which overlies the well, as best shown in Fig. 7, said base-plate being preferably connected with the I-beams 16. Said guide rods are connected at their upper ends by a curved brace 69, and are also connected by braces 70—71 with the upper end of the shaft 31. The object of making the brace 69 curved is to allow the plunger rods to be conveniently removed from the well. The cross-head 66 is connected with the outer end of the lever 37 so that as said lever swings upward and outward it reciprocates the inner plunger rod 63. In like manner the outer plunger rod 64 is connected by a swivel connection 72 with a cross-head 73, which also slides on the guide rods 67—68, and is connected with the lower lever 50.

74 indicates the well-tube and 75 the discharge outlet therefrom, as shown in Fig. 1.

The operation of the pumping mechanism is as follows: Assuming that the parts are in the position shown in Fig. 1 and that the outer cam 27 is rotating in a clockwise direction, as indicated by the arrow on said figure, and the inner cam 20 is rotating in the opposite direction. At this time the upper cross-head 34, with the lower lever 50 connected therewith, are at the upper end of their stroke, and the lower cross-head 30, with the upper lever 37 connected therewith, will have moved a short distance upward, in the early part of their upward stroke. As soon as the highest points of the cams 20—27 pass from under the rollers 35—36 of the upper cross-head, said cross-head will begin to descend, carrying down the lever 50, and the lever 37 will continue its upward stroke owing to the fact that the rollers 32—33 of the lower crosshead are riding up on the long inclined surfaces of the oppositely moving cams 20—27, which surfaces are indicated for convenience by $a, a'$ in Fig. 1. The descending surfaces of said cams are indicated by $b\ b'$ in said figure. Owing to the fact that the descending inclines $b\ b'$ of the two cams are shorter than the ascending surfaces $a\ a'$, the descending lever will reach the lower end of its stroke before the other lever reaches the upper end of its stroke, and consequently will start up again while the upwardly moving lever is still moving up. At such time, therefore, both plungers will be lifting, and therefore there will be no intermission in the upward flow of water, and consequently no shock or pounding. Furthermore, owing to the fact that the two cams act upon each pair of rollers at opposite sides of the axis thereof, the cross-head to which said rollers are connected will be lifted or lowered vertically, its rollers riding in the saddles formed by the coacting inclines of the cams, and there will be no substantial tendency of the cross-heads to rotate, since such inclines are moving toward or from each other at equal speeds and are equally inclined in opposite directions. The manner in which the two cams act on the rollers is illustrated in Fig. 10, in which one of the rollers is shown as near the upper limit of its movement. If desired, the cross-heads may be feathered on the shaft 31 to further insure against any tendency on their part to rotate, but that is not necessary.

So far as I am aware, I am the first in the art to provide oppositely rotating coacting cams for reciprocating the plunger or plungers of a single or of a double-acting pump in the manner described; moreover, I believe I am the first in the art to provide a rotary cam member for reciprocating a plunger together with other rotary means adapted by its action to overcome the tendency of the plunger and its connected parts to move with the rotating cam; and my claims are therefore to be construed accordingly.

That which I claim as my invention, and desire to secure by Letters Patent, is,—

1. The combination of a reciprocatory plunger, operating means therefor, and a pair of cam-members adapted to be moved in opposite directions in engagement with said operating means, the cam action of one of said members being coincident with that of the other member.

2. The combination of a reciprocatory plunger, operating means therefor, and a pair of cam-members adapted when moved in opposite directions to coöperate to move said plunger through engagement with said operating means, the rotary effect of one of said members upon said operating means being offset by the rotary effect of the other member thereon.

3. The combination of a reciprocatory plunger, operating means therefor, and a pair of cam members adapted when moved in opposite directions in engagement with said operating means to positively actuate the same.

4. The combination of a reciprocatory plunger, operating means therefor, and a pair of cam members adapted when moved in opposite directions to coöperate to move said plunger through engagement with said operating means substantially perpendicularly relative to the plane of movement of said cam members.

5. The combination of a reciprocatory plunger, operating means therefor, and a pair of rotary cam members adapted when moved in opposite directions to coöperate to move said plunger through engagement with said operating means substantially parallel with the axis of rotation of said cams.

6. The combination of a plunger adapted to be reciprocated up and down, operating means therefor, and a pair of cam members adapted when moved in opposite directions in engagement with said operating means to positively raise the same.

7. The combination of a plunger adapted to be reciprocated up and down, operating means therefor, and a pair of cam members adapted when moved in opposite directions in engagement with said operating means to positively raise the plunger and thereafter to positively lower the same.

8. The combination of a reciprocatory plunger, operating means therefor, and a pair of cam-members one adapted to revolve within the other, said cam-members being adapted when rotated in opposite directions to actuate said operating means to reciprocate said plunger.

9. The combination of a reciprocatory plunger, operating means therefor, and a pair of concentrically-arranged cam-members adapted when rotated in opposite directions to actuate said operating means to reciprocate said plunger.

10. The combination of a pair of rotary cam-members one adapted to revolve within the other, a reciprocatory plunger extending through said cam-members, and operating means for said plunger, said cam-members being adapted when rotated in opposite directions to actuate said operating means to reciprocate said plunger.

11. An actuating mechanism for a pump having a reciprocating plunger, comprising a plurality of rotating cams the adjacent portions of which in their rotation move in oposite directions, and reciprocating means actuated by said cams connected with the plunger rod of the pump.

12. An actuating mechanism for a pump having a pair or reciprocating plungers, comprising a plurality of double rotating cams the adjacent portions of which in their rotation move in opposite directions, and reciprocating means actuated by said cams and connected respectively with the plunger rods of the pump.

13. An actuating mechanism for a reciprocating pump, comprising a pair of rotating cams the adjacent portions of which in their rotation move in opposite directions having similar co-acting inclined lifting surfaces and similar co-acting inclined lowering surfaces, and means actuated by said inclined surfaces and connected with the plunger rod of the pump for reciprocating the same.

14. An actuating mechanism for a reciprocating pump, comprising a pair of rotating cams the adjacent portions of which in their rotation move in opposite directions having similar co-acting inclined lifting surfaces and similar co-acting inclined lowering surfaces, and a cross-head actuated by said inclined surfaces and connected with the plunger rod of the pump for reciprocating the same.

15. An actuating mechanism for reciprocating pumps having a plurality of plunger rods, comprising a pair of rotating cams the adjacent portions of which in their rotation move in opposite directions having similar inclined lifting surfaces and similar inclined lowering surfaces, and a pair of cross-heads disposed at right angles to each other and actuated by said inclined surfaces, said cross-heads being connected respectively with the plunger rods of the pump.

16. An actuating mechanism for reciprocating pumps having a plurality of plunger rods, comprising a pair of rotating cams the adjacent portions of which in their rotation move in opposite directions having similar inclined lifting surfaces and similar inclined lowering surfaces, said lowering inclined surfaces being shorter than the lifting inclined surfaces, and a pair of cross-heads disposed at right angles to each other and actuated by said inclined surfaces, said cross-heads being connected respectively with the plunger rods of the pump.

17. An actuating mechanism for pumps having a reciprocating plunger rod, comprising a pair of rotating cams the adjacent portions of which in their rotation move in opposite directions having co-acting lifting and lowering surfaces, a lever connected with the plunger rod of the pump, and means actuated by said cams for operating the said lever.

18. An actuating mechanism for pumps having a plurality of reciprocating plunger rods, comprising a pair of rotating cams the adjacent portions of which in their rotation move in opposite directions having co-acting lifting and lowering surfaces, a pair of levers connected with said plunger rods, and means actuated by said cams and connected with said levers respectively for operating the same.

19. An actuating mechanism for pumps having reciprocating plunger rods, comprising a pair of rotating cams the adjacent portions of which in their rotation move in opposite directions having co-acting lifting and lowering surfaces, the lifting surfaces being longer than the lowering surfaces, levers connected with said plunger rods, and means actuated by said cams and connected with said levers for operating the same.

20. In a pump, the combination of a plunger adapted to be reciprocated up and down, operating means connected therewith, a cam member adapted to engage said operating means for raising said plunger at intervals, and other means moving in the direction opposite to that of the cam member adapted to prevent a shifting of the operating means in the direction of movement of the cam member.

21. In a pump, the combination of a plunger adapted to be reciprocated up and down, operating means connected therewith, a rotary cam member engaging said operating means and adapted by its rotation to raise said plunger at intervals, and other means rotating in the opposite direction adapted to prevent rotation of said operating means with said cam.

22. In a pump, the combination of a plunger adapted to be reciprocated up and down, operating means connected therewith, a rotary cam member engaging said operating means and adapted by its rotation to raise said plunger at intervals, and other means engaging said operating means and rotating in the opposite direction from that of the cam member and at the same axial speed of rotation adapted to overcome the tendency of the operating means and the plunger to rotate with said cam.

23. An actuating mechanism for pumps having a reciprocating plunger rod, a pair of oppositely rotating cams having coöperating inclined lifting and lowering surfaces, a cross-head actuated by said cams, said cross-head being connected with said lever for actuating the same.

24. An actuating mechanism for pumps having reciprocating plunger rods, comprising a pair of oppositely rotating cams having coöperating inclined lifting and lowering surfaces, and a pair of cross-heads disposed at right angles to each other and operated by said cams, said cross-heads being connected respectively with said levers for actuating the same.

25. An actuating mechanism for pumps having reciprocating plunger rods, comprising a pair of oppositely rotating cams having co-acting inclined lifting and lowering surfaces, a pair of cross-heads operated by said cams, a pair of levers connected with said plunger rods and with said cross-heads respectively, and swinging fulcra for said levers.

26. An actuating mechanism for pumps having reciprocating plunger rods, comprising upper and lower rotary members having cams provided with coöperating inclined lifting and lowering surfaces, said members having oppositely disposed annular racks, a gear between and meshing with said racks for rotating said members in opposite directions, and a cross-head operated by said cams, said cross-head being connected with said plunger rod.

27. An actuating mechanism for pumps having a reciprocating plunger rod, comprising upper and lower rotary members having cams provided with coöperating inclined lifting and lowering surfaces, said members having oppositely disposed annular racks, a gear between and meshing with said racks for rotating said members in opposite directions, and cross-heads operated by said cams, said cross-heads being connected with said rod.

28. An actuating mechanism for pumps having reciprocating plunger rods, comprising a pair of oppositely rotating cams having co-acting inclined lifting and lowering surfaces, cross-heads operated by said cams, levers connected with said plunger rods respectively, and means connecting said cross-heads respectively with said levers, said connecting means being movable transversely.

29. A pump comprising a plurality of pump rods, two rotary members, a cam having a plurality of lifting and lowering surfaces carried by each of said rotary members, means for rotating said rotary members so that their adjacent portions move in opposite directions, and connecting means connecting said rods with said cams for operating said rods for pumping purposes.

30. A pump comprising a plurality of pump rods, two horizontal rotary members, a vertically extended cam having a plurality of lifting and lowering surfaces carried by each of said members, means for rotating said rotary members so that their adjacent portions move in opposite directions, and a plurality of members adapted to ride on and between said cam surfaces and pump rods.

31. A pump comprising a plurality of pump rods, levers for operating said pump rods respectively, two rotary members mounted horizontally, a series of vertically extended cams carried by said rotary members, means for rotating said rotary members in opposite directions, and members connected with said levers respectively for operating the same, the latter members having anti-friction rollers adapted to ride on said cams.

32. A pump comprising a plurality of pump rods, levers for operating said pump rods respectively, two rotary members mounted horizontally, a series of vertically extended cams carried by said rotary members, means for rotating said rotary members in opposite directions, and U-shaped members connected with said levers respectively for operating the same, the latter members having anti-friction rollers adapted to ride on said cams.

33. In a pump comprising a plurality of pumping rods, and reciprocating means therefor consisting of two sets of cams rotating in opposite directions about a common axis.

34. A pump comprising a plurality of pumping rods, reciprocating means consisting of two sets of oppositely rotating cams having concentrically positioned driving gears, and a pinion meshing with both of said gears and acting to drive one gear in one direction and the other in the other direction.

MATTHEW T. CHAPMAN.

Witnesses:
W. A. FURNNER,
W. H. DE BUSK.